United States Patent
Abbott, III et al.

(10) Patent No.: US 11,249,249 B2
(45) Date of Patent: Feb. 15, 2022

(54) METHOD OF IDENTIFYING WIDEBAND MMF FROM 850 NM DMD MEASUREMENTS

(71) Applicant: CORNING INCORPORATED, Corning, NY (US)

(72) Inventors: John Steele Abbott, III, Elmira, NY (US); Scott Robertson Bickham, Corning, NY (US); Thomas Arthur Hanson, Corning, NY (US); Tiffany Ann Lindstrom, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/429,203

(22) Filed: Jun. 3, 2019

(65) Prior Publication Data

US 2019/0383999 A1  Dec. 19, 2019

Related U.S. Application Data

(60) Provisional application No. 62/685,051, filed on Jun. 14, 2018.

(51) Int. Cl.
  *G02B 6/028* (2006.01)
  *G01M 11/00* (2006.01)
  *H04L 12/873* (2013.01)

(52) U.S. Cl.
  CPC ......... *G02B 6/0288* (2013.01); *G01M 11/332* (2013.01); *G01M 11/338* (2013.01); *H04L 47/528* (2013.01)

(58) Field of Classification Search
  None
  See application file for complete search history.

(56) References Cited

U.S. PATENT DOCUMENTS

| 4,186,979 A | 2/1980 | Litchfield |
| 4,286,979 A | 9/1981 | Buckler et al. |

(Continued)

FOREIGN PATENT DOCUMENTS

| EP | 3196624 A1 | 7/2017 |
| WO | 2016022884 A1 | 2/2016 |

(Continued)

OTHER PUBLICATIONS

IEC 60793-1-49: Optical Fibres, Part 1: Measurement Methods and Test Procedures, Section 49: Differential Mode Delay; (2006) 66 Pages.

(Continued)

*Primary Examiner* — Chris H Chu
(74) *Attorney, Agent, or Firm* — Amy T. Lang; John P. McGroarty

(57) ABSTRACT

A method is used to select a multimode fiber meeting requirements of a first minimum bandwidth at a first wavelength and a second minimum bandwidth at a second wavelength different from the first wavelength. Differential mode delay (DMD) data is measured for the multimode fiber at the first wavelength. The DMD data comprises output laser pulse data as a function of the radial position of an input laser pulse having the first wavelength. The DMD data is transformed into mode group space, to obtain relative mode group delay data as a function of mode group. The multimode fiber is selected based on meeting requirements of the first minimum bandwidth at the first wavelength based on a first set of criteria, comprising a first criterion using as input the measured differential mode delay (DMD) data for the multimode fiber measured at the first wavelength. The multimode fiber is selected based on meeting requirements of the second minimum bandwidth at the second wavelength based on a second set of criteria, comprising: a second (Continued)

criterion using as input the relative mode group delay data.
A related system is also described.

18 Claims, 12 Drawing Sheets

(56) References Cited

U.S. PATENT DOCUMENTS

| | | | |
|---|---|---|---|
| 2014/0319354 A1 | 10/2014 | Chen et al. | |
| 2015/0086161 A1 | 3/2015 | Bickham et al. | |
| 2016/0254861 A1 | 9/2016 | Molin et al. | |
| 2017/0146428 A1* | 5/2017 | Bickham | G01M 11/30 |
| 2017/0176285 A1* | 6/2017 | Molin | G01M 11/338 |
| 2018/0359025 A1* | 12/2018 | Molin | G02B 6/02214 |
| 2019/0011633 A1* | 1/2019 | Molin | G02B 6/0288 |

FOREIGN PATENT DOCUMENTS

| | | |
|---|---|---|
| WO | 2016034913 A1 | 3/2016 |
| WO | 2016087892 A1 | 6/2016 |
| WO | 2018071264 A1 | 4/2018 |

OTHER PUBLICATIONS

Freund et al. "High-speed transmission in multimode fibers," Journal of Lightwave Technology 26(4) 2010, pp. 569-586.
International Search Report and Written Opinion of the European International Searching Authority; PCT/US2019/036497; dated Sep. 12, 2019; 13 Pgs.

* cited by examiner

METHOD OF IDENTIFYING WIDEBAND MMF FROM 850 NM DMD MEASUREMENTS

This application claims the benefit of priority to U.S. Provisional Application Ser. No. 62/685,051 filed on Jun. 14, 2018, the content of which is relied upon and incorporated herein by reference in its entirety.

FIELD

This description pertains to a method of selecting optical fiber that meets certain performance criteria at a second wavelength based on measurements performed at a first wavelength different from the second wavelength.

BACKGROUND

Multimode optical fiber used with short-wavelength VCSELs (vertical cavity surface emitting lasers) has emerged as a dominant technology for short-reach high data networks. Examples of such networks include office buildings and data centers. Copper networks are increasingly unable to meet the requirements of such networks. Single mode optical fiber can achieve much greater data rates and transmission lengths than multimode optical fiber. But, a network using multimode fiber coupled with VCSELs is less expensive than a network using single mode optical fiber coupled with the types of lasers, splices and connectors required by single mode optical fiber and the small core diameter of single mode fiber. The higher data rates and transmission lengths achievable with single mode fiber are not required for short-reach high data networks. So, multimode fiber provides an effective low-cost optical connectivity solution for such networks.

Multimode fiber operated at 850 nm is presently a leading optical media used in short-reach high data networks. Such fiber typically meets an industry-standard set of requirements referred to as "OM4," which imposes minimum bandwidth requirements at 850 nm. But, recent trends are driving multimode fiber to longer wavelengths. So, the recently ratified OM5 industry-standard requirements impose minimum bandwidth requirements at 953 nm. Due to desires for compatibility with legacy 850 nm systems and wavelength division multiplexing capability, OM5 fiber must also meet the OM4 requirements. So, the OM5 standard includes all of the requirements of the OM4 standard, plus additional minimum bandwidth requirements at 953 nm.

The manufacturing process for optical fiber inevitably leads to variations from fiber to fiber that affects fiber performance. For example, a process designed to produce OM4 fiber may result in a high yield of fiber that actually meets the OM4 requirements, but there may be some fibers that do not. So, before being sold, each fiber is typically measured and verified to meet the OM4 specifications prior to shipment. For example, a bandwidth measurement at 850 nm may determine that a fiber does not meet the OM4 requirements, but does meet the OM3 requirements. If the measured 850 nm bandwidth verifies that a fiber meets the OM4 requirements, a second bandwidth measurement at 953 nm may be performed to determine if this fiber also meets the OM5 requirements. There are other types of industry-standard requirements, such as OM1, OM2 and OM3. In addition, customers sometimes ask for fiber that meets non-standard requirements, for example a minimum bandwidth requirement at a wavelength not specified in the industry standards, or a minimum bandwidth requirement higher than those required by industry standards.

Table 1 shows the industry standard requirements for OM1, OM2, OM3, OM4 and OM5 fibers as of June, 2018. OM1 and OM2 are now in an informative annex for IEC11801 as grandfathered specifications.

TABLE 1

Multimode optical fiber nomenclature and bandwidths
Nomenclature reference: ISO/IEC 11801 and ANSI/TIA-568-C.3

| Fiber Type | Core Diameter (μm) | Year Introduced | Overfilled Launch Bandwidth (OFL BW) | | | Effective Bandwidth (Laser Launch) (EMB) | |
|---|---|---|---|---|---|---|---|
| | | | 850 nm | 1300 nm | 953 nm | 850 nm | 953 nm |
| OM1 | 62.5 | 1986-89 | 200 | 500 | n/a | n/a | n/a |
| OM2 | 50 | 1981 | 500 | 500 | n/a | n/a | n/a |
| OM3 | 50 | 2002 | 1500 | 500 | n/a | 2000 | n/a |
| OM4 | 50 | 2009 | 3500 | 500 | n/a | 4700 | n/a |
| OM5 | 50 | 2016 | 3500 | 500 | 1850 | 4700 | 2470 |

Multimode fiber is verified to meet the OM4 standard requirement of 4700 Mhz-km for a 850 nm laser source by performing an industry standard measurement referred to as a Differential Mode Delay, or "DMD" measurement, on the fiber using an 850 nm laser. Industry standards allow this measurement to be used in two different ways. First, the results of the DMD measurement, which provide data for various radial positions of an input laser pulse, may be compared to a mask. If the DMD measurement meets the requirements of the mask, the fiber qualifies as meeting the 4700 MHz-km requirement. Second, the results of the DMD measurement may be used to calculate an effective minimum bandwidth (calculated), or "minEMBc." If the minEMBc is above a threshold value the fiber is verified to meet the OM4 requirement, which is (4700 MHz-km/1.13)=4160 MHz-km at 850 nm. The ISO/IEC 11801 and ANSI/TIA-568-C.3 standards define a fiber as meeting the requirements for an OM4 or OM5 fiber if minEMBc is greater than or equal to the Minimum Modal Bandwidth numbers in Table 1 divided by 1.13, as opposed to a direct comparison to the bandwidth numbers in Table 1. Similarly, minEMBc times 1.13 may be compared to the values in Table 1 for purposes of verifying OM4 and OM5 fiber. Unless otherwise specified, this document uses the same convention. The DMD measurement at 850 nm may also be used to qualify the fiber as meeting the OM4 standard requirement of 3500 MHz-km for an overfilled launch, or OFL, using a different set of calculations. For OM5 fiber the same specifications at 850 nm are required, as well as a DMD measurement and minEMBc at a wavelength of 953 nm.

Some fiber manufacturers have an installed base of equipment tailored to performing this DMD measurement at 850 nm. In addition, a fiber manufacturer may have a database of DMD measurements measured at 850 nm for OM4 fiber in inventory. An additional DMD measurement may be performed at a second wavelength, such as the 953 nm of the OM5 standard, or at other customer-specified wavelengths. However, given that the fibers meeting this second criterion are a small subset of the manufacturing distribution, it is not cost-effective to perform the second measurement on every single fiber. Accordingly, there is a need for a method to select multimode fibers likely to meet bandwidth requirements at 953 nm or other wavelengths based on DMD measurements performed at 850 nm. More generally, there is a need for a method to select fiber likely to meet bandwidth requirements at a second wavelength based on DMD measurements performed at a first wavelength different from the second wavelength.

SUMMARY

In a first embodiment, a method is used to select a multimode fiber meeting requirements of a first minimum bandwidth at a first wavelength and a second minimum bandwidth at a second wavelength different from the first wavelength. Differential mode delay (DMD) data is measured for the multimode fiber at the first wavelength. The DMD data comprises output laser pulse data as a function of the radial position of an input laser pulse having the first wavelength. The DMD data is transformed into mode group space, to obtain relative mode group delay data as a function of mode group number. The multimode fiber is selected based on meeting requirements of the first minimum bandwidth at the first wavelength based on a first set of criteria, comprising a first criterion using as input the measured differential mode delay (DMD) data for the multimode fiber measured at the first wavelength. The multimode fiber is selected as having a high probability of meeting requirements of the second minimum bandwidth at the second wavelength based on a second set of criteria, comprising: a second criterion using as input the relative mode group delay data.

In a second embodiment, for the method of the first embodiment, the first wavelength is less than the second wavelength.

In a third embodiment, for the method of any of the first through second embodiments, the DMD data measured at the first wavelength ($F_{xt}$) is transformed into mode group delay data ($h_{gt}$) by inversion of a $P_{xg}$ matrix.

In a fourth embodiment, for the method of the third embodiment, the inversion uses a linear constrained least squares approach that constrains $h_{gt}$ to be a smooth function of mode group (g).

In a fifth embodiment, for the method of the fourth embodiment, the inversion is performed after weighting the coefficients of the mode groups.

In a sixth embodiment, for the method of any of the first through fifth embodiments, the method further comprising calculating an effective minimum bandwidth at the first wavelength (minEMBc$_1$) from the DMD data measured at the first wavelength. The first criterion requires that minEMBc$_1$ is greater than or equal to a first threshold value.

In a seventh embodiment, for the method of any of the first through sixth embodiments, the method further comprises applying a first mask to the DMD data measured at the first wavelength. The first criterion requires that the DMD data measured at the first wavelength passes the first mask.

In an eighth embodiment, for the method of any of the first through seventh embodiments, the first wavelength is in the range 847 nm-853 nm.

In a ninth embodiment, for the method of the sixth embodiment, the first wavelength is in the range 847 nm-853 nm and the first threshold value is 4160 MHz-km.

In a tenth embodiment, for the method of any of the eighth through ninth embodiments, the method further comprises calculating from the DMD data measured at the first wavelength an overfilled launch bandwidth at the first wavelength (OFLc$_1$). The first set of criteria further comprises a criterion requiring that OFLc$_1$ is greater than or equal to 3500 MHz-km.

In an eleventh embodiment, for the method of any of the first through tenth embodiments, the method further comprises deconvolving the relative mode group delay data at the first wavelength to calculate minEMBc$_2$. The second criterion requires that minEMBc$_2$ is greater than or equal to a second threshold value.

In a twelfth embodiment, for the method of the eleventh embodiment, the first wavelength is in the range 847 nm-853 nm, the second wavelength is in the range 950 nm-956 nm, and the second threshold value is 2190 MHz-km.

In a thirteenth embodiment, for the method of any of the first through twelfth embodiments, the relative mode group delays are calculated relative to the average delays of mode groups 2 through 15.

In a fourteenth embodiment, for the method of any of the first through thirteenth embodiments, the method further comprises applying a second mask to the relative mode group delay data. The second criterion requires that the relative mode group delay data passes the second mask.

In a fifteenth embodiment, for the method of the fourteenth embodiment, the first wavelength is in the range 847 nm-853 nm, the second wavelength is in the range 950 nm-956 nm, and the second mask requires:
- the relative delay of the LP01 mode is equal to or greater than −0.02 ns/km;
- the relative delay of the LP01 mode is equal to or less than 0.2 ns/km;
- the relative delay of each of mode groups 2 through 5 is equal to or greater than −0.005 ns/km;
- the relative delay of each of mode groups 2 through 5 is equal to or less than 0.065 ns/km;
- the relative delay of each of mode groups 12 through 15 is equal to or greater than −0.055 ns/km;
- the relative delay of each of mode groups 12 through 15 is equal to or less than 0.005 ns/km.

In a sixteenth embodiment, for the method of the fifteenth embodiment, the second mask requires:
- the relative delay of each of mode groups 6 through 10 is equal to or greater than −0.055 ns/km;
- the relative delay of each of mode groups 6 through 10 is equal to or less than 0.065 ns/km.

In a seventeenth embodiment, for the method of the fourteenth embodiment, the first wavelength is in the range 847 nm-853 nm, the second wavelength is in the range 950 nm-956 nm, and the second mask requires
- the relative delay of the LP01 mode is equal to or greater than −0.02 ns/km;
- the relative delay of the LP01 mode is equal to or less than 0.14 ns/km;

the relative delay of each of mode groups 2 through 5 is equal to or greater than 0.0 ns/km;
the relative delay of each of mode groups 2 through 5 is equal to or less than 0.06 ns/km;
the relative delay of each of mode groups 11 through 15 is equal to or greater than −0.05 ns/km; and
the relative delay of each of mode groups 11 through 15 is equal to or less than 0.0 ns/km.

In an eighteenth embodiment, for the method of the seventeenth embodiment, the second mask requires, for the relative mode group delay data:
the relative delay of each of mode groups 6 through 10 is equal to or greater than −0.05 ns/km;
the relative delay of each of mode groups 6 through 10 is equal to or less than 0.06 ns/km.

In a nineteenth embodiment, for the method of the fourteenth embodiment, the first wavelength is in the range 847 nm-853 nm, the second wavelength is in the range 950 nm-956 nm, and the second mask requires:
the relative delay of the LP01 mode is equal to or greater than −0.02 ns/km;
the relative delay of the LP01 mode is equal to or less than 0.14 ns/km;
the relative delay of each of mode groups 2 through 5 is equal to or greater than 0.0 ns/km;
the relative delay of each of mode groups 2 through 5 is equal to or less than 0.05 ns/km;
the relative delay of each of mode groups 12 through 15 is equal to or greater than −0.04 ns/km; and
the relative delay of each of mode groups 12 through 15 is equal to or less than 0.0 ns/km.

In a twentieth embodiment, for the method of the nineteenth embodiment, the second mask requires, for the relative mode group delay data:
the relative delay of each of mode groups 6 through 10 is equal to or greater than −0.04 ns/km;
the relative delay of each of mode groups 6 through 10 is equal to or less than 0.05 ns/km.

In a twenty-first embodiment, for the method of any of the first through twentieth embodiments, the method further comprises: measuring differential mode delay (DMD) data for the multimode fiber at the second wavelength, wherein the DMD data comprises output laser pulse data as a function of the radial position of an input laser pulse having the second wavelength. The method further comprises selecting the multimode fiber based on meeting requirements of the second minimum bandwidth at the second wavelength based on a third set of criteria in addition to the second set of criteria. The third set of criteria comprises: a third criterion using as input the measured differential mode delay (DMD) data for the multimode fiber measured at the second wavelength.

In a twenty-second embodiment, for the method of the twenty-first embodiment, the method further comprises calculating an effective minimum bandwidth at the second wavelength (minEMBc$_2$) from the DMD data measured at the second wavelength. The third criterion comprises a requirement that minEMBc$_2$ is greater than or equal to a second threshold value.

In a twenty-third embodiment, the method of any of the twenty-first and twenty-second embodiments further comprises applying a third mask to the DMD data measured at the second wavelength. The third criterion comprises a requirement that the DMD data measured at the second wavelength passes the parameters of the third mask.

In a twenty-fourth embodiment, for the method of any of the twenty-first through twenty-third embodiments, the second wavelength is in the range 950 nm to 956 nm.

In a twenty-fifth embodiment, for the method of the twenty-second embodiment, the second wavelength is in the range 950 nm to 956 nm, and the second threshold value is 2190 MHz-km.

In a twenty-sixth embodiment, the method of any of the twenty-first through twenty-fifth embodiments further comprises calculating from the DMD data measured at the second wavelength an overfilled launch bandwidth at the second wavelength (OFLc$_2$), and wherein the third set of criteria further comprise a criterion requiring that OFLc$_2$ is greater than or equal to 1850 MHz-km.

In a twenty-seventh embodiment, for the method of any of the twenty-first through twenty-sixth embodiments, the second set of criteria are satisfied before measuring differential mode delay (DMD) data for the multimode fiber at the second wavelength.

In a twenty-eighth embodiment, a method is used to select from a plurality of multimode fibers, a third subset of the multimode fibers meeting requirements of a first minimum bandwidth at a first wavelength and a second minimum bandwidth at a second wavelength greater than the first wavelength. The method comprises:
measuring differential mode delay (DMD) data for the plurality of multimode fibers at the first wavelength, wherein the DMD data comprises output laser pulse data as a function of the radial position of an input laser pulse having the first wavelength;
selecting a first subset of the plurality of multimode fibers based on criteria comprising:
passing a first mask applied directly to the DMD data measured at the first wavelength;
transforming the DMD data into mode group space, to obtain relative mode group delay data as a function of mode group for each of the plurality of multimode fibers in the second subset;
selecting a second subset of the plurality of multimode fibers based on criteria comprising:
passing a second mask applied to the relative mode group delay data as a function of mode group; and
selecting the third subset of the plurality of multimode fibers by applying further selection criteria.
The first subset is a subset of the plurality of multimode fibers. The second subset is a subset of the first subset. The third subset is a subset of the second subset.

In a twenty-ninth embodiment, the method of the twenty-eighth embodiment further comprises: measuring differential mode delay (DMD) data for the plurality of multimode fibers at the second wavelength. The DMD data comprises output laser pulse data as a function of the radial position of an input laser pulse having the second wavelength. The further selection criterion comprises passing a third mask applied directly to the DMD data measured at the first wavelength.

In a thirtieth embodiment, for the method of the twenty-ninth embodiment, the second subset is selected before measuring differential mode delay (DMD) data for the plurality of multimode fibers at the second wavelength.

In a thirty-first embodiment, for the method of the thirtieth embodiment, measuring differential mode delay (DMD) data for the plurality of multimode fibers at the second wavelength is performed only on the second subset.

In a thirty-second embodiment, a system includes components for selecting a multimode fiber meeting requirements of a first minimum bandwidth at a first wavelength and a second minimum bandwidth at a second wavelength greater than the first wavelength. The system comprises:
- a measurement device configured to measure differential mode delay (DMD) data for the multimode fiber at the first wavelength, wherein the DMD data comprises output laser pulse data as a function of the radial position of an input laser pulse having the first wavelength;
- a processor device configured to transform the DMD data into mode group space, to obtain mode group delays relative to the average delays of mode groups 2 through 15;
- a first selection device configured to select the multimode fiber if the multimode fiber passes a first mask applied to the DMD data for the multimode fiber at the first wavelength;
- a second selection device configured to select the multimode fiber if the multimode fiber passes a second mask applied to the relative mode group delay data.

In a thirty-third embodiment, a method is used to select a multimode fiber meeting requirements of a first minimum bandwidth at a first wavelength and a second minimum bandwidth at a second wavelength different from the first wavelength. The method comprises: selecting the multimode fiber based on meeting requirements of the first minimum bandwidth at the first wavelength based on a first set of criteria comprising: a first criterion using as input differential mode delay (DMD) data for the multimode fiber measured at the first wavelength; and selecting the multimode fiber based on meeting requirements of the second minimum bandwidth at the second wavelength based on a second set of criteria, comprising: a second criterion using as input relative mode group delay data obtained from the differential mode delay (DMD) data measured at the first wavelength. The thirty-third embodiment may be combined with the limitations of the second through twenty-sixth embodiments in any permutation, including permutations that exclude the limitations of the first embodiment.

The twenty-eighth through thirty-second embodiments may be combined with the first through twenty-seventh and thirty-third embodiments in any permutation.

DETAILED DESCRIPTION

Figure 1A:
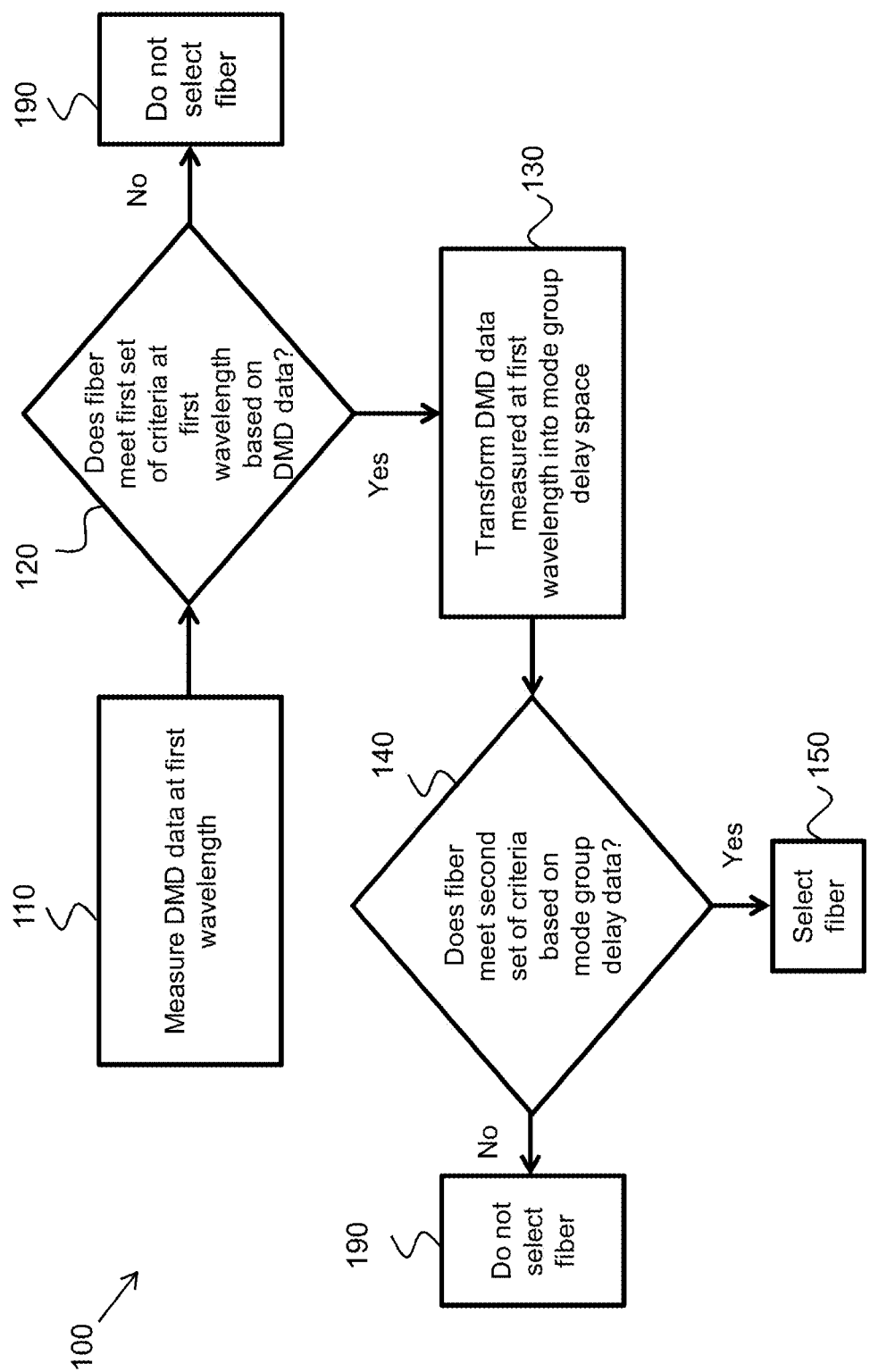
FIG. 1A shows a flowchart for practicing a method.

Fiber Selection for Bandwidth Performance at Multiple Wavelengths

The recently adopted OM5 standards require that multimode fibers meet certain bandwidth requirements at 953 nm, in addition to the bandwidth requirements at 850 nm required by the OM4 standard. In other words, OM5 fiber will also meet OM4 standards. Until new manufacturing techniques are developed, it may be that only a small percentage of OM4 fibers also meet OM5 standards. This is due in part to the fact that many OM4 fibers may have been fabricated using methods and specifications targeted at producing OM4 fiber, without much consideration of meeting OM5 standards.

OM4 fibers are verified to meet the OM4 standards using DMD measurements performed at 850 nm. So, manufacturers of OM4 fibers are well-equipped to perform DMD measurements at 850 nm, and may have a database of such DMD measurements for OM4 fiber in inventory.

At present, OM5 fibers are qualified based on meeting the OM5 standards using DMD measurements performed at 953 nm. But, fiber manufacturers have not previously needed to perform a large volume of DMD measurements at 953 nm, and may not be well-equipped to do so for every fiber produced. It is a challenge to determine when an OM4 fiber may also meet OM5 standards without performing extensive additional measurements at 953 nm, including measurements on many fibers that ultimately will not qualify as meeting OM5 standards.

So, there is a need to use the DMD measurements performed at 850 nm to select OM4 fibers as likely (or not) to meet the OM5 standard. Such a selection process would enable a fiber manufacturer to perform DMD measurements at 953 nm only on OM4 fibers likely to meet the OM5 standard, based on further analysis of the DMD data obtained at 850 nm used to qualify the fiber based on meeting the OM4 standard.

More generally, fiber manufacturers may have a database of DMD measurements at one or more particular wavelengths, and/or the capability to obtain such measurements relatively easily at the one or more particular wavelengths. But, the market or specific customers may demand fibers having specified performance characteristics at other wavelengths. So, there is a need to use DMD measurements performed at a first wavelength to select fibers likely to meet performance characteristics at a second wavelength different from the first, before without actually performing a DMD measurement at the second wavelength. Once a fiber is selected as likely to meet performance characteristics at the second wavelength, a DMD measurement may be performed at the second wavelength to confirm that the fiber meets the required performance characteristic at the second wavelength.

This selection process significantly reduces the number of DMD measurements needed at a second wavelength, such as 953 nm. As a result, there is an increase in the efficiency and speed of identifying fibers meeting performance specifications at the second wavelength, such as the identification of fibers meeting the OM5 bandwidth requirements at 953 nm.

While many of the examples herein are directed to using DMD measurements performed at 850 nm to predict whether a fiber will meet bandwidth requirements at 953 nm, the methods described are more generally applicable, and may be used to predict whether a fiber will meet bandwidth requirements at a second wavelength different from a first wavelength at which DMD measurements are performed. The second wavelength may be less than or greater than the first wavelength. The second wavelength may be in the range between and including 980 and 1064 nm, for example 980 nm, 1000 nm, 1020 nm or 1064 nm.

The first and second wavelengths are often wavelengths of particular interest due to standards-based requirements, specific consumer requirements, or the availability of measuring devices at one or both of the wavelengths.

Bandwidth

A signal traveling down an optical fiber comprises multiple pulses of light. The light is injected into the input end of the fiber, and detected at the output end of the fiber. Signal integrity requires that the pulses are distinguishable from each other and from background noise at the output end of the fiber. The "bandwidth" of a fiber is a measure of how many distinguishable pulses can be sent down a length of fiber per unit time. A higher "bandwidth" means that the pulses can be closer together, such that more information can be transmitted per unit time. Certain phenomena that limit bandwidth, such as attenuation and pulse spreading, often become more pronounced as the distance traveled by the pulse increases. So, a given fiber is capable of higher bandwidths at lower lengths. As a result, the bandwidth of a fiber is often provided in units of frequency times length, specifically MHz-km. For example, an OM4 fiber is required to have a minimum effective modal bandwidth of 4700 MHz-km when the input pulses are from an 850 nm laser.

Some phenomena, such as absorption, cause the light pulses to attenuate as they travel down the fiber. When the signal attenuates to the point that it cannot be reliably distinguished from background noise, the signal loses integrity. Some phenomena, such as modal dispersion, cause light pulses to spread out as they travel down an optical fiber. When this spreading causes the pulses to overlap to the point that adjacent pulses in a signal cannot be distinguished, the signal loses integrity. This loss of integrity, from whatever cause, limits the bandwidth of a fiber. For OM4 and OM5 fiber, modal dispersion is often the phenomenon that limits the performance of a multimode fiber.

Bandwidth and related terms as used herein are defined as follows:

Bandwidth: When a pulse of light is launched into a multimode fiber, it gradually spreads. The pulse spreading of a multimode fiber is quantified by the 'bandwidth', by taking the Fourier Transform H(f) of the input pulse and the output pulse and looking at the ratio of amplitudes |H_out(f)|/|H_in(f)|. The 'bandwidth' is defined as the frequency f where this ratio first decreases to 0.5. For an output pulse which is Gaussian with a standard deviation of $\sigma$ nsec/km, the bandwidth is approximately $0.19/\sigma$ GHz·km.

Modal Bandwidth: The Modal Bandwidth of a multimode fiber is the bandwidth attributed to spreading due to modal dispersion (different delay differences between modes), separate from other effects such as chromatic dispersion. In this case the output pulse depends on the relative power in each mode group and the relative delay between the groups. "Modal bandwidth" depends not only on the mode delays of the fiber but also on their relative power, which depends on launch conditions. For example, an "overfilled launch," where an equal amount of power is launched into each individual mode, may result in a different measured or calculated modal bandwidth than a launch from a specific VCSEL.

Effective Modal Bandwidth (EMB): The EMB of a fiber combines the mode group delays, which is a fiber attribute, and the power in the mode groups, which is an attribute of specific launch condition (for example a VCSEL laser).

The terms "bandwidth" and "modal bandwidth" are generic, and can refer to bandwidths using different launch conditions. The term "effective modal bandwidth" relies on defining launch conditions. A person of skill in the art can often tell from the context what the terms mean. For example, a discussion of bandwidth in the context of a standard refers to bandwidth as defined by the standard. As used herein, unless otherwise specified or clear from context, the terms "bandwidth," "modal bandwidth" and "effective modal bandwidth" refer to minEMBc as standardized by ISO/IEC 11801 and ANSI/TIA-568-C.3.

The term EMBc (calculated EMB) refers to constructing an output pulse using a weighted sum of DMD pulses. A single DMD for a fiber can be used to simulate the effect of different lasers by using different weighting functions. The term minEMBc refers to the minimum EMBc of a set of 10 EMBc's generated with 10 different weighting functions, standardized by TIA and IEC. For OM3, OM4, and OM5 fibers the minEMBc calculated from the DMD measurement must meet a certain specification.

Mode Groups and Modal Dispersion

In the field of optical fiber, a "mode" is an electric field distribution that is self-consistent during propagation down an optical fiber. The number of modes that a particular fiber supports depends on the core diameter and numerical aperture of the fiber and the wavelength of light. Smaller core diameters and smaller numerical apertures support fewer modes. A single mode fiber has only one guided propagation mode when used with the intended transmission wavelength, and as such does not suffer from modal dispersion. A multimode fiber has a finite number of guided propagation modes. A "mode group" is a group of modes that have the same "effective index" even though they may travel through different parts of the fiber core. These modes couple strongly to each other and travel at approximately the same speeds in the fiber. For example, the first mode group is comprised of the LP01 mode, which has two polarization components and is considered a mode group for purposes of this disclosure. The second mode group is comprised of two spatially degenerate LP11 modes, each with two polarization components. The third mode group is comprised of the LP02 mode and the two spatially degenerate LP21 modes, each having two polarization components. A multimode fiber with a core diameter of 50 microns and an NA of 0.2 typically supports 18 mode groups at 850 nm.

Different mode groups may travel at different speeds in an optical fiber. As a result, the signal from an input pulse of light that excites multiple modes spreads out as the signal travels along the fiber, because the different modes travel at different speeds. This spreading is called "modal dispersion." Modal dispersion occurs even for monochromatic signals, i.e., single wavelength signals. For a multimode optical fiber used with typical light sources, modal dispersion is often the primary factor that limits the bandwidth of the fiber.

Modal dispersion is dependent on wavelength. So, the same fiber may have different modal dispersion behavior at different wavelengths.

DMD Measurements

It is difficult to directly measure the propagation speed of a single mode group in a multimode fiber, because most input signals excite multiple mode groups. So, the result of any given input signal results in data that contains a mix of information about various mode groups. DMD or "Differential Modal Dispersion" measurements are often performed to obtain this type of data. A DMD measurement is performed by focusing a pulsed laser at a specific location on the core of an optical fiber being tested. A high-speed detector and sampling oscilloscope receive the laser pulses exiting the fiber. The output pulse amplitude as a function of time is recorded. Then, the laser spot is stepped across the fiber core radius. At each position, similar amplitude and time data are recorded. The data is then used to determine a relative delay for each of the radial pulses. Unless otherwise specified, the highest peak of a pulse is used to determine a single point in time at which the pulse is located. "Relative delay" for a DMD measurement is relative to a reference delay, for example the delay measured when the radial offset of the laser is 7 microns from the centerline of the fiber. Unless otherwise specified, relative delay was calculated relative to the delay measured when the radial offset of the laser is 7 microns from the centerline of the fiber.

Unless otherwise specified, the DMD measurements described herein are performed according to IEC 60793-1-49.

A DMD measurement provides information about the relative delay of light propagating through a multimode optical fiber as a function of the radial position of an input pulse of light.

Radial Space and Mode Group Space

For purposes of this application, a "space" is a mathematical concept related to a coordinate system. In "radial space," data is provided as a function of the radial position of an input signal—there is a data point, data set or curve for each radial position of the input laser pulse. Radial position may be thought of as an axis, such as the x-axis, of the radial space coordinate system. In "mode group space," data is provided as a function of mode group—there is a data point, data set or curve for each mode group. Mode group may be thought of as an axis of the mode group space coordinate system.

DMD data is recorded in "radial space," because data is measured for various positions of a laser pulse relative to the centerline of the fiber. DMD data includes information about mode group delay. But, it is difficult to directly see this information because the mode group delay information is mixed into various radial positions. At each input radial position, the input laser pulse excites multiple modes. And, each mode is excited by multiple laser positions. For positions close to the center of the core, lower order modes are preferentially excited. For positions close to the edge of the core, higher order modes are preferentially excited. As such, the relative delay of each laser pulse in a DMD measurement is caused by a combination of various mode group delays. But, DMD data does not directly provide information about the relative delay of each mode group. DMD data in radial space is at a particular wavelength, the wavelength at which that data was measured.

Figure 5:
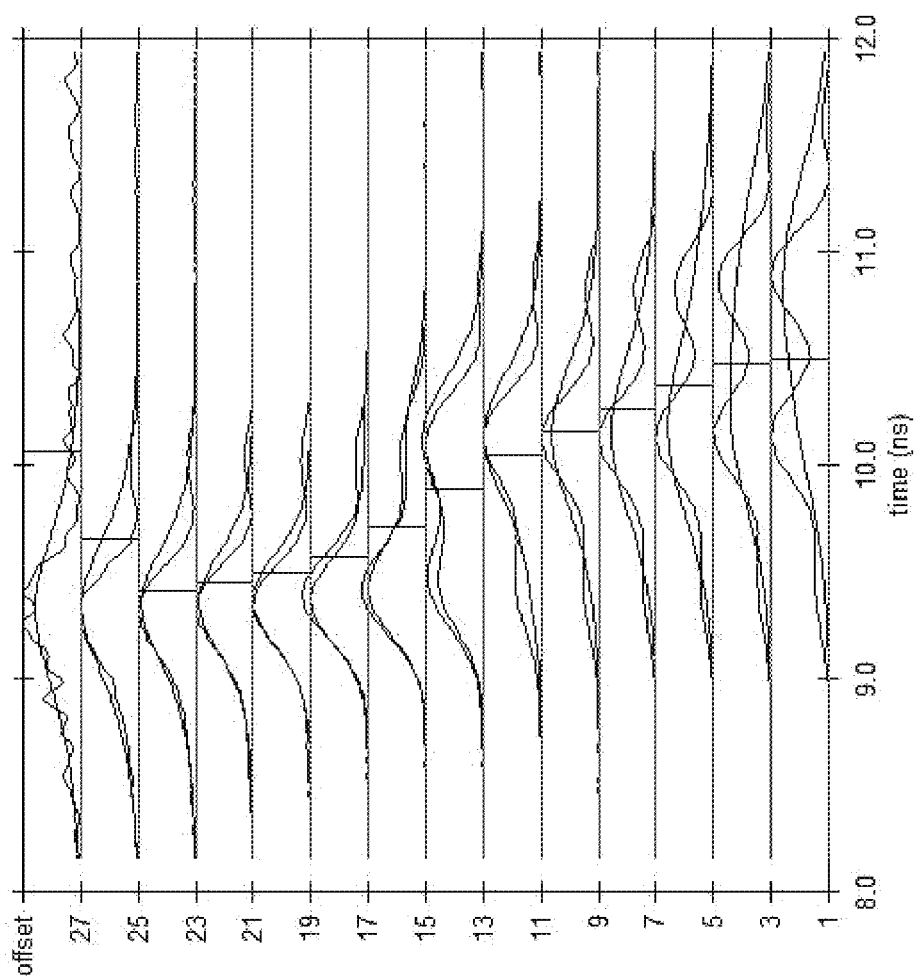
FIG. 5 shows delay vs. radial offset obtained from a DMD measurement for a first multimode optical fiber.
Figure 7:
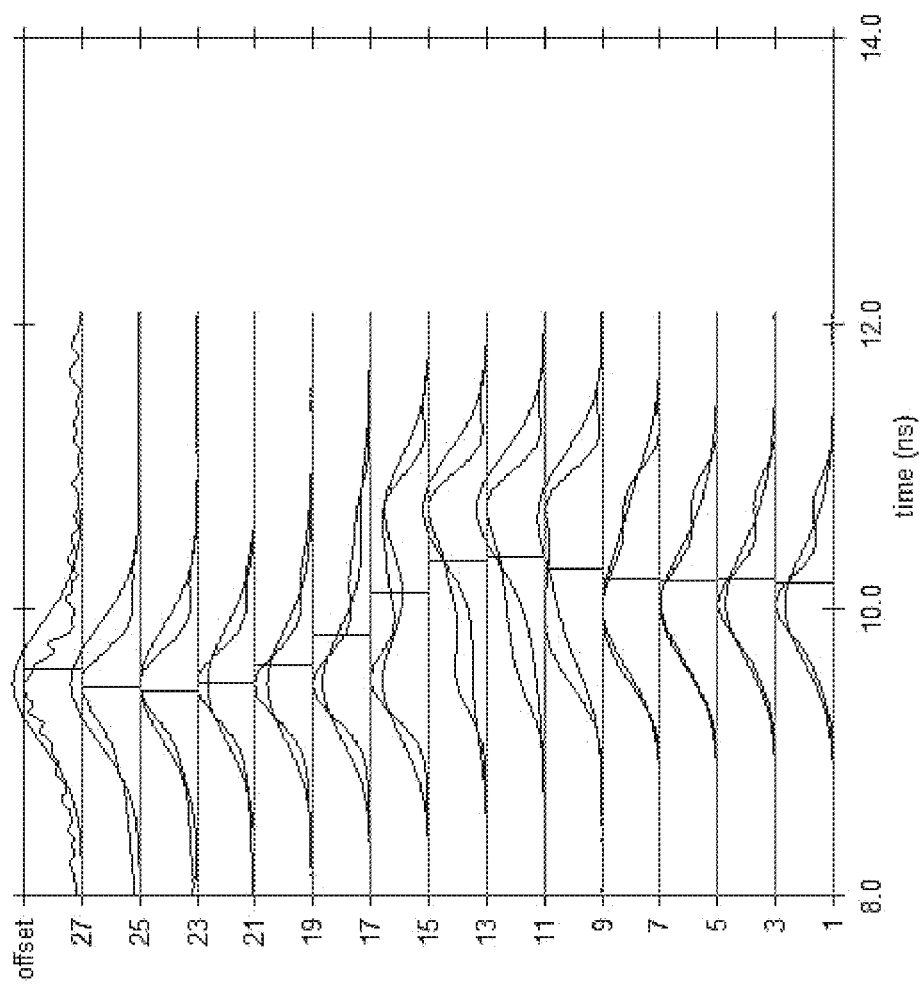
FIG. 7 shows delay vs. radial offset obtained from a DMD measurement for a second multimode optical fiber.
Figure 9:
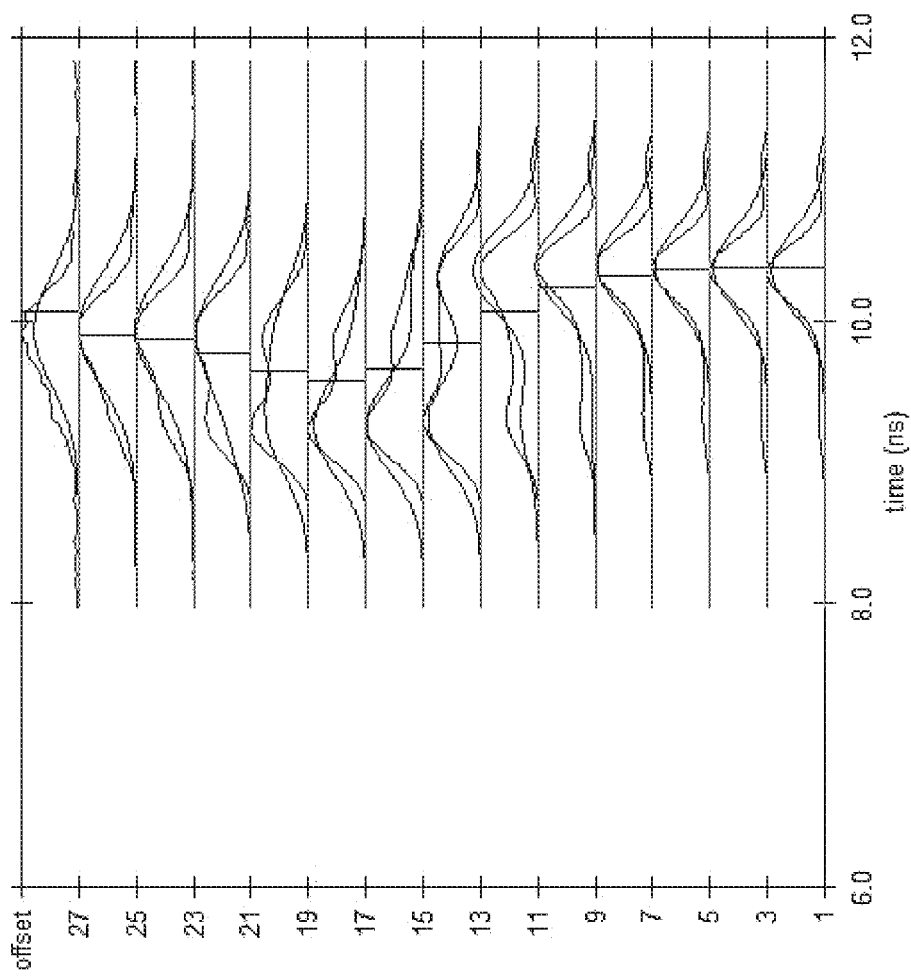
FIG. 9 shows delay vs. radial offset obtained from a DMD measurement for a third multimode optical fiber.

FIGS. 5, 7 and 9 show examples of DMD data in radial space. The use of an offset or radial position on the Y-axis indicates that the data is in radial space.

Transformation to Mode Group Space

For example, the DMD measurement can be represented in radial space by a matrix $F_{xt}$, where x is the offset and $F_{xt}$ is the discretized matrix of the measured DMD pulse data $F_x(t)$ at offset x. $F_{xt}$ is a matrix with a row for each radial offset and a column for each discrete point in time measured. The same data can be represented in mode group space by a matrix $h_{gt}$, where g is mode group, and $h_{gt}$ is the discretized matrix of the data $h_g(t)$ for mode group g. $h_{gt}$ is a matrix with a row for each mode group and a column for each discrete point in time measured.

A "transformation" is a way to map data from one space into another space. The relative delay of each mode group $h_{gt}$ may be obtained from $F_{xt}$ by a transformation from radial space to mode group space. Similarly, $F_{xt}$ may be obtained from $h_{gt}$ by a transformation from mode group space to radial space. For example, data in a $h_{gt}$ matrix can be transformed from mode group space to radial space (data in a $F_{xt}$ matrix) by combining "g" mode group delay functions, $h_g(t)$ with a weighting given by a $P_{xg}$ matrix:

$$F_{xt} = \Sigma_g P_{xg} h_{gt} \tag{1}$$

For example, the $P_{xg}$ matrix is the same as the $P_{rg}$ matrix described in IEC-60793-1-49 section C2, but with different notation. It is a matrix that defines the relative power in mode group 'g' for DMD offset 'x'. It can be calculated numerically using overlap integrals between the input beam from the launch fiber and the fiber modes.

When DMD data is measured, in the equation above, the matrix $F_{xt}$ of measured data and the theoretical $P_{xg}$ matrix are known. The matrix $h_{gt}$ can be estimated by a transformation from radial space to mode group space, which is an 'inverse transform' of the transformation from mode group space to radial space described in the preceding paragraph.

One issue encountered in the transformation of the DMD data from radial space to mode group space is the "spot-size" effect, which is a result of the excitation of multiple mode groups at a given offset x due to the finite size of the laser excitation spot. One method proposed in U.S. Pat. No. 6,400,450B1 to overcome the spot-size effect is to use an iterative nonlinear least squares approach to estimate the discrete mode group delays. However, this methodology is computer-intensive and impractical for production use.

We have discovered that we can construct a matrix inverse to $P_{xg}$, which we designate as $Q_{gx}$, by using a linearly-constrained least squares approach. A $Q_{gx}$ based on directly inverting $P_{xg}$ may lead to undesirable noise when used to transform data from radial space to mode group space. Mathematically smoothing $P_{xg}$ solves this problem, while still resulting in usable mode group space data. This smoothing is accomplished by minimizing the following equation for each value of time t:

$$\chi_t^2 = \Sigma_x (F_{xt} - \Sigma_g P_{xg} h_{gt})^2 + \lambda_1 \Sigma_{g'} (0_{g't} - \Sigma_g D_{g'g} h_{gt})^2 \tag{2}$$

The first term in Equation 1 satisfies equation 1, and the second term in Equation 2 forces $h_{gt}$ to be a smooth function of g. The coefficient $\lambda_1$ ensures that this smoothness requirement is a small constraint. $\lambda_1$ is determined empirically on a case by case basis—the minimum $\lambda_1$ that results in a smooth solution for $h_{gt}$ should be used. Using a value of $\lambda_1$ that is too large emphasizes smoothness too much, resulting in a loss of information. Using a value of $\lambda_1$ that is too small results in undesirable noise as described above. Each term of the matrix $0_{g't}$, which has mode group for rows and time for columns, has a value of zero. $D_{g'g}$ is a square matrix which has mode groups for columns and rows, and values of $-2$ on the diagonal ($g=g'$) and 1 on the off-diagonal ($g=g'\pm 1$). $\chi^2$ is a measure of fitting error, i.e., how well $h_{gt}$ fits the equation above. Equation 2 can be solved by standard least-squares techniques using singular value decomposition, as described in Numerical Recipes: The Art of Scientific Computer (Press et al., Cambridge University Press, 1986). The result is an $h_{gt}$ that is "smooth" relative to an $h_{gt}$ calculated using the original $P_{xg}$ matrix.

Equation (2) is written in its specific form to be equivalent to an augmented linear matrix equation suitable for least squares solution with singular value decomposition:

$$\begin{pmatrix} F_{xt} \\ 0_{gt} \end{pmatrix} = \begin{vmatrix} P_{xg} \\ \lambda_1 D_{gg} \end{vmatrix} (h_{gt})$$

The top 'row' of the augmented vector and augmented matrix is the first term in equation (2), and the bottom 'row' is the second term. The matrix $Q_{gx}$ is the pseudoinverse (least squares inverse) of this augmented matrix.

$Q_{gx}$ is a matrix with mode group g for rows and offset x for columns and is obtained by using standard matrix decomposition techniques, as described in Numerical Recipes: The Art of Scientific Computer (Press et al., Cambridge University Press, 1986). Once obtained, $Q_{gx}$ may be used for multiple fibers.

The inverse matrix $Q_{gx}$ can then be used to generate the function $h_{gt}$ with a simple matrix multiplication:

$$h_{gt} = \sum_{x} Q_{gx} F_{xt}$$

If there are 18 mode groups (for example) supported by the core of the MMF, there will be 18 $h_{gt}$ functions, and the mode group delay $\tau_g$ of the $g^{th}$ mode group will be the value of t where $h_{gt}$ exhibits a maximum.

In this transformation from radial space to mode group space, the total output power in the DMD as a function of offset is assumed to be $$P_x^{tot} = \sum_{g} P_{xg}$$

If this total power $P_x^{tot}$ does not agree with the measured total power $P_x^{meas}$, then the relative attenuations of the mode groups are corrected using a second constrained least squares problem to solve $$P_x^{meas} = \sum_{g} P_{xg} A_g$$

where $A_g$ are weighting coefficients for each mode group g, and $P_{xg}$ is replaced by $P_{xg} A_g$ before inversion to obtain $Q_{gx}$.

Figure 11:
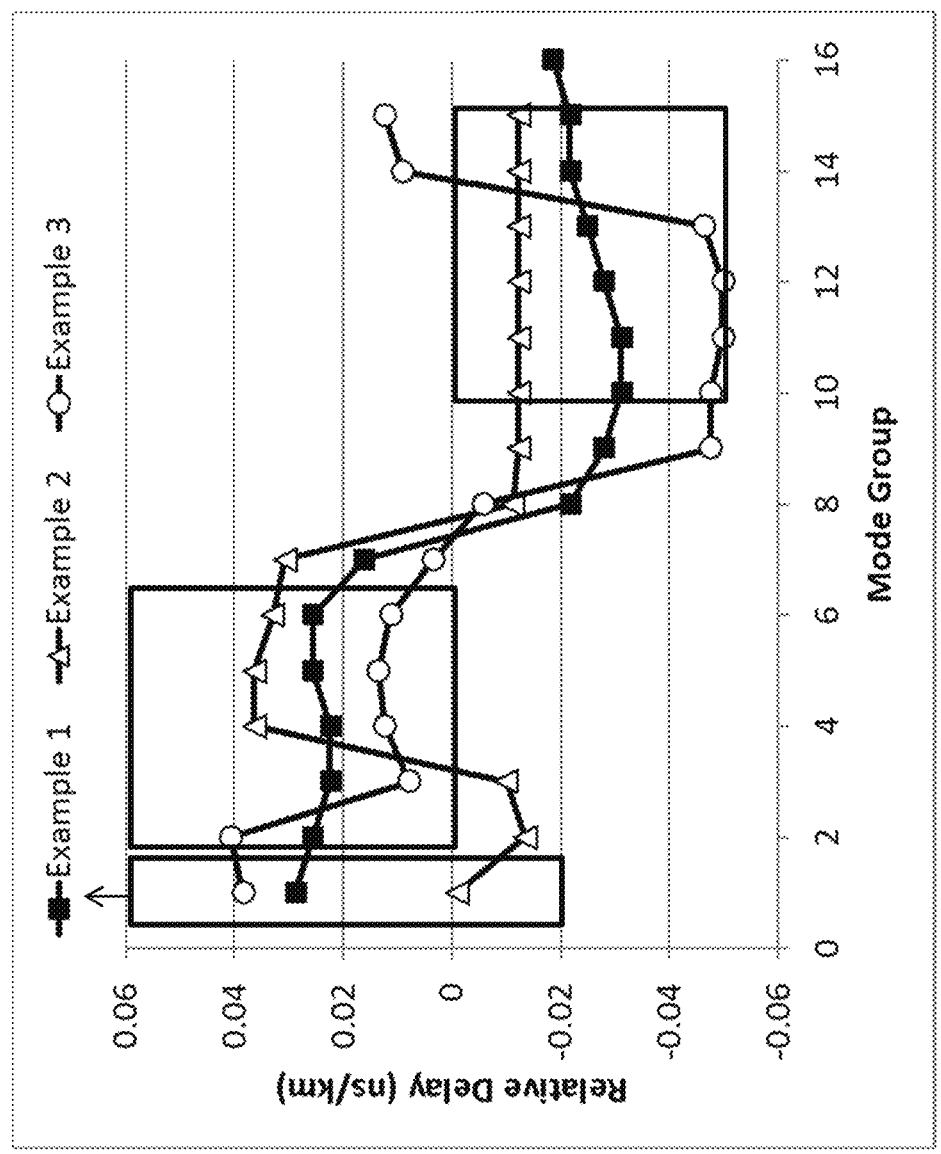
FIG. 11 shows relative mode group delay data extracted from the DMD traces of FIGS. 6, 8 and 10, compared to the second mask of FIG. 3.

Data in both radial and mode group space depends on wavelength, and changes as wavelength changes. Unless otherwise specified, the wavelength for a data set is the wavelength at which the data was measured, even if the data has been transformed into mode group space. For example, when the second mask of FIG. 11 is applied to data in mode group space, the data is obtained from a transformation of DMD data measured at the first wavelength. So, the mode group data still retains its association with the first wavelength, even though it is being used to predict bandwidth performance at a second wavelength.

Unless otherwise specified, relative delay in mode group space was calculated relative to the average delays of mode groups 2 through 15.

Selection of Fiber

FIG. 1A shows a flowchart 100 for a method of selecting fiber. In step 110, a fiber is measured to obtain DMD data at a first wavelength. In step 120, the method proceeds to step 130 if the fiber meets a first set of criteria at the first wavelength based on the DMD data. Otherwise, the fiber is not selected (step 190). In step 130, the DMD data measured at the first wavelength is transformed into mode group space. In step 140, the fiber is selected (step 150) if the fiber meets a second set of criteria based on the relative mode group delay data. Otherwise, the fiber is not selected (step 190).

Figure 1B:
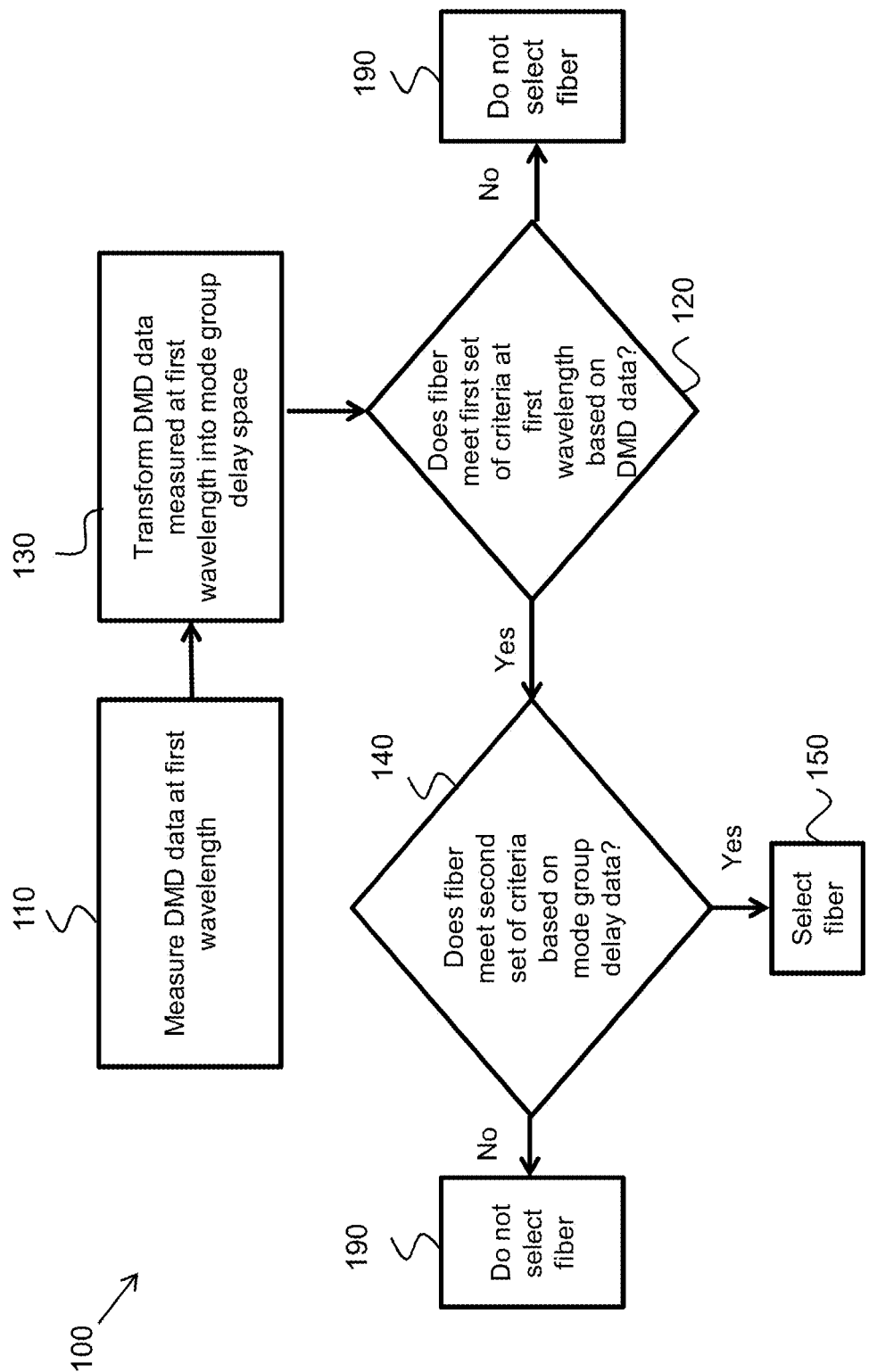
FIG. 1B shows a flowchart for practicing a method

FIG. 1B shows a flowchart 100 for an alternative method of selecting fiber. In step 110, a fiber is measured to obtain DMD data at a first wavelength. In step 130, the DMD data measured at the first wavelength is transformed into mode group space. The method then proceeds to step 120. In step 120, the method proceeds to step 140 if the fiber meets a first set of criteria at the first wavelength based on the DMD data. Otherwise, the fiber is not selected (step 190). In step 140, the fiber is selected (step 150) if the fiber meets a second set of criteria based on the relative mode group delay data. Otherwise, the fiber is not selected (step 190).

The first wavelength may be any wavelength at which DMD data can be obtained for multimode optical fiber. For example, the first wavelength may be 850 nm (or 847-853 nm), which is the wavelength at which many fiber manufacturers measure DMD data for fiber in order to qualify the fiber based on meeting OM4 standards. But, any other suitable wavelength may be used.

As used herein, a reference to a single "wavelength" encompasses a range of wavelengths around the single wavelength that accounts for allowable deviations in wavelength normally associated with standards-based DMD measurements at that wavelength and the associated laser sources. For example, for DMD measurements performed at 850 nm and 953 nm, the relevant standards allow for a 3 nm deviation in the wavelength at which the measurement is performed. So, a measurement "at" 850 nm may be performed using a laser with a wavelength in the range 847 nm-853 nm. Similarly, a measurement at 953 nm may be performed using a laser with a wavelength in the range 950 nm-956 nm. Endpoints are included in these ranges. Similarly, other references to the exact values 850 nm and 953 nm include a surrounding range of +/−3 nm, as allowed by the relevant OM4 and OM5 standards.

Minimum Bandwidth at First Wavelength

In step 120, the multimode fiber is selected based on meeting requirements of the first minimum bandwidth at the first wavelength based on a first set of criteria comprising: a first criterion using as input the measured differential mode delay (DMD) data for the multimode fiber measured at the first wavelength. There are two "first criterion" that are industry standard for OM4 fibers.

In some embodiments, a first criterion is the application of one or more masks to DMD data measured at 850 nm. The DMD data is compared to one or more masks specified in IEC 60793-1-49: Optical Fibres, Part 1: Measurement Methods and Test Procedures, Section 49: Differential Mode Delay. If the data meets the requirements of any of the masks, the fiber will meet the minimum effective modal bandwidth requirements specified in the OM4 standard for laser input at 850 nm, which is 4700 MHz-km at 850 nm.

In some embodiments, a first criterion is the calculation of minEMBc$_1$ from the DMD data. For this calculation, IEC 60793-1-49 specifies 10 different weightings of DMD traces that correspond to 10 different laser input conditions. These 10 weightings have been selected in the standard to cover a wide range of actual input conditions corresponding to the wide range of power and intensity distributions supplied by different source manufacturers that supply 850 nm VCSEL sources. Based on these weightings, an EMBc$_1$ is calculated for each of the 10 different laser input conditions. The lowest of these 10 EMBc$_1$ is minEMBc$_1$. MinEMBc$_1$ is then compared to the minimum EMB required by the IEC standard, which is 4160 MHz-km at 850 nm for OM4 fiber, after accounting for the factor of 1.13 used when comparing minEMBc values to the values set forth in the IEC standard.

DMD data may also be used to determine whether a fiber meets the OM4 requirements for an overfilled launch. An overfilled launch refers to input light conditions typical of certain types of LEDs used historically with OM4 fiber, where the light source typically launches light uniformly into all modes of a multimode fiber. This use of LEDs as light sources is presently declining in favor of laser sources. But, legacy systems may use LED light sources, and the OM4 standard includes a minimum bandwidth requirement for use with an overfilled launch. For example, DMD data measured at a first wavelength, such as 850 nm for OM4 fiber, may be used to calculate an overfilled launch bandwidth at the first wavelength ($OFLc_1$). For OM4 fiber, the first set of criteria further comprise a criterion requiring that $OFLc_1$ is greater than or equal to 3500 MHz-km.

Transformation of DMD Data into Mode Group Space

After the first set of criteria is met, the DMD data measured at the first wavelength is transformed in step 130 into mode group space. This transformation may be by any suitable method, such as inversion of the P×g matrix, as described above. This transformation results in data, such as relative mode group delay data, as a function of mode group.

Figure 6:
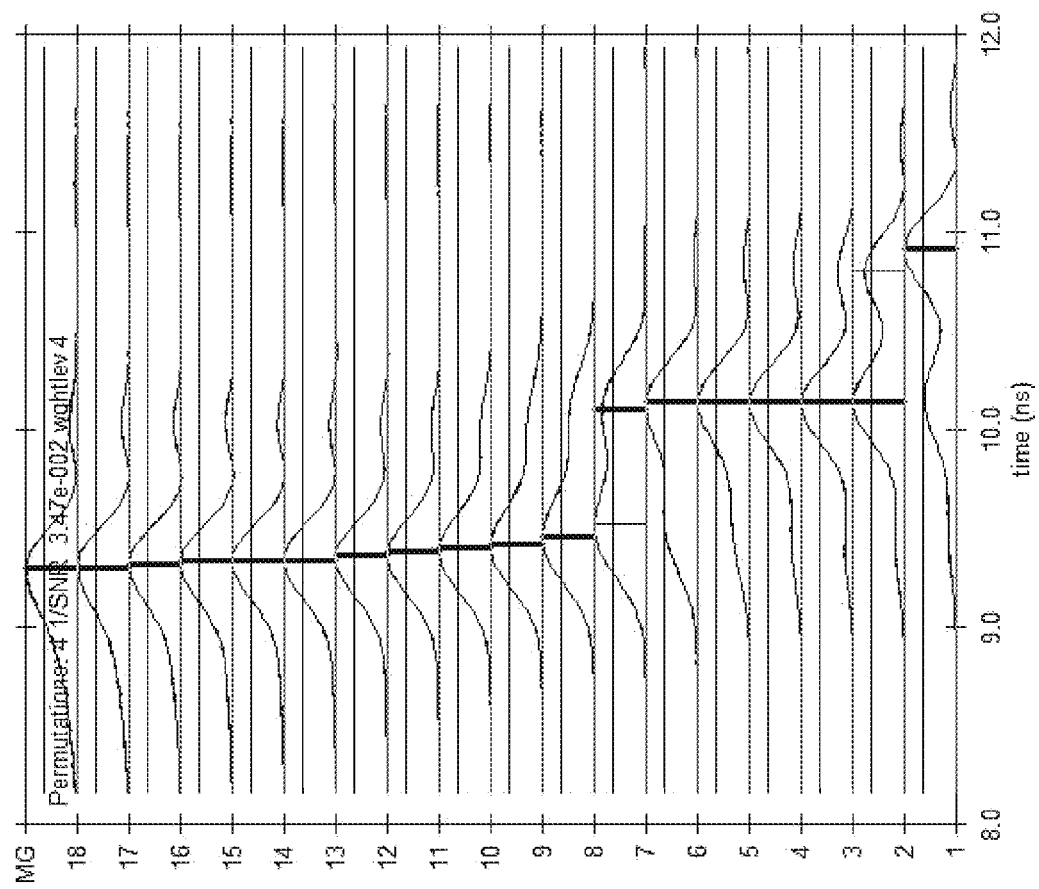
FIG. 6 shows delay vs. mode group for the first multimode optical fiber.
Figure 8:
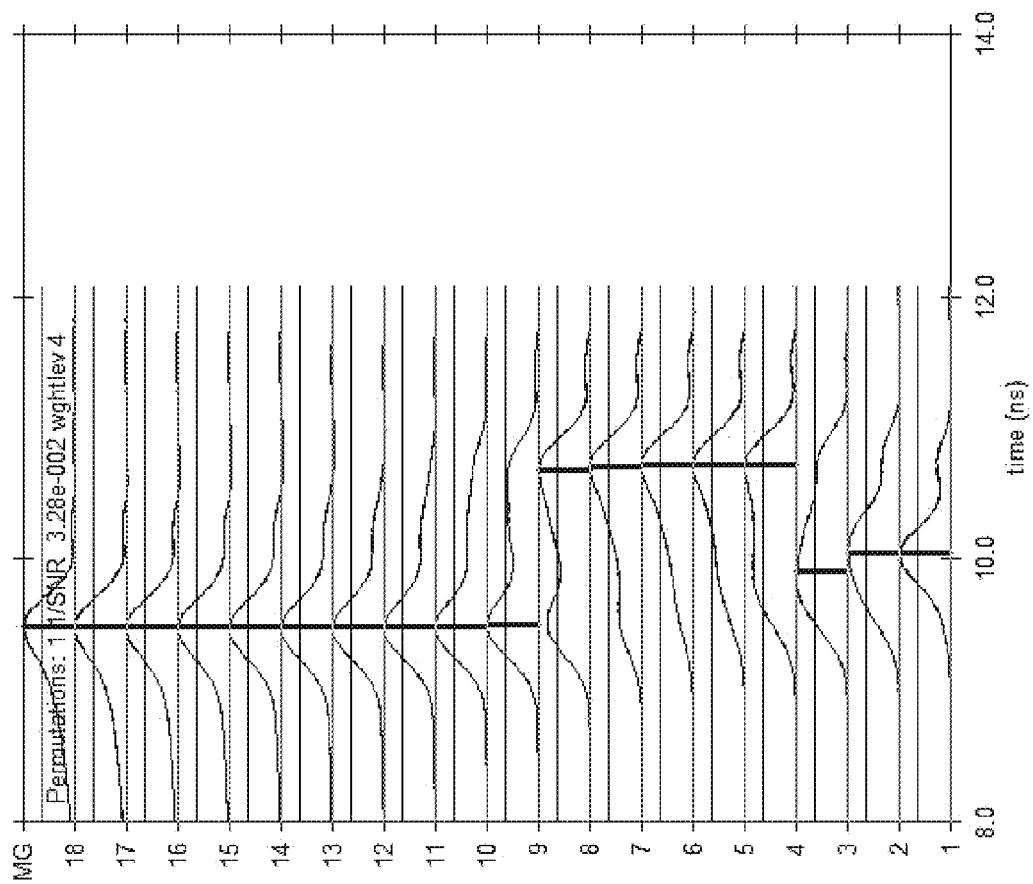
FIG. 8 shows delay vs. mode group for the second multimode optical fiber.
Figure 10:
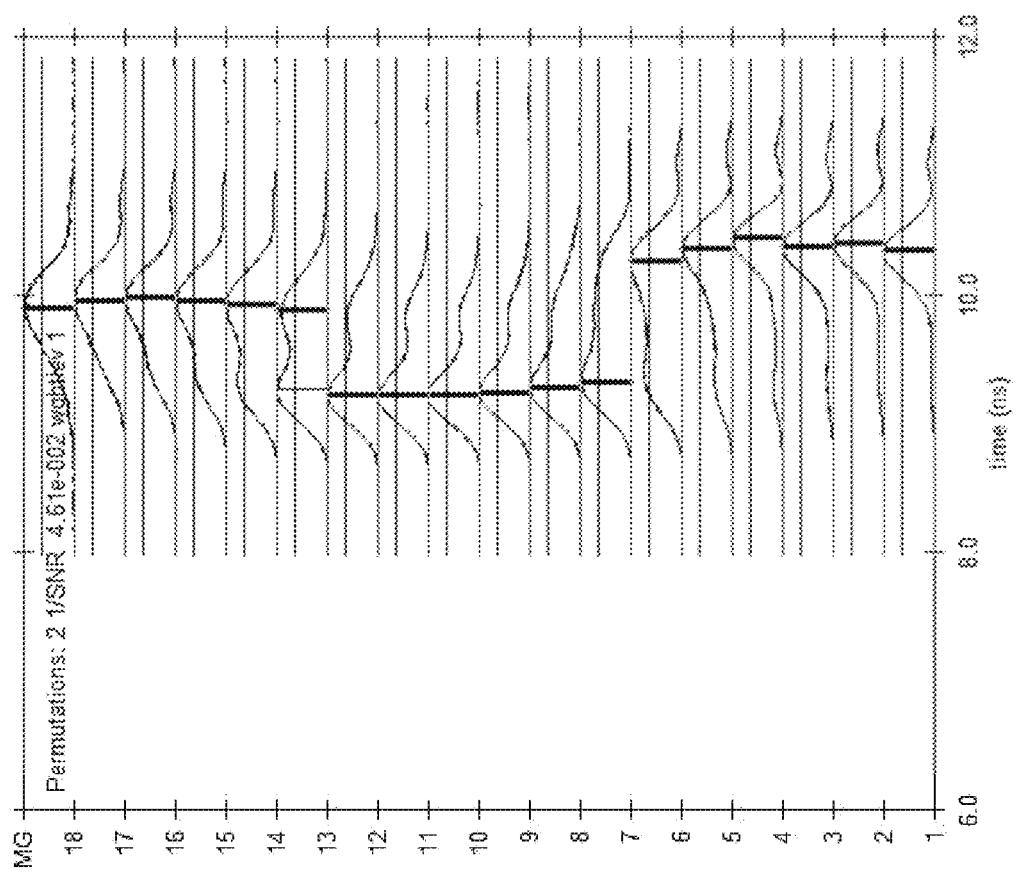
FIG. 10 shows delay vs. mode group for the third multimode optical fiber.

FIGS. 5, 7 and 9 show measured DMD data for Examples 1, 2 and 3, respectively, in radial space. FIGS. 6, 8 and 10, respectively, show the result of transforming this measured DMD data into mode group space. FIGS. 6, 8 and 10 show examples of DMD data in mode group space. The use of mode group (MG) on the Y-axis of FIGS. 6, 8 and 10 indicate that the data is in mode group space.

Minimum Bandwidth at Second Wavelength

In step 140, the multimode fiber is selected based on meeting requirements of the second minimum bandwidth at the second wavelength based on a second set of criteria comprising: a second criterion using as input the relative mode group delay data based on measurement at the first wavelength. This relative mode group delay data is ultimately based on the same DMD measurements used to evaluate whether the first set of criteria were met—measurements performed at the first wavelength. At the present time, there are no standards for the second criterion.

In some embodiments, a second criterion involves calculating $minEMBc_2$ at the second wavelength from the relative mode group delay data. The second criterion requires that $minEMBc_2$ is greater than or equal to a second threshold value. Mode group delay is dependent on wavelength. But, this wavelength dependence is reasonably predictable, more so than for radial delay data. So, the relative mode group delay data measured at the first wavelength may be used to predict the mode group delays at the second wavelength, and the mode group delay data at the second wavelength may then be used to predict a $minEMBc_2$ value at the second wavelength. If the predicted $minEMBc_2$ exceeds a second threshold value, the fiber is selected, and a DMD measurement at the second wavelength may be performed to verify that the EMB of fiber meets or exceeds the second threshold value.

In some embodiments, a second criterion involves applying a second mask to the relative mode group delay data. The second criterion requires that the relative mode group delay data passes the second mask. A mask sets upper and lower limits for relative pulse delay. As used herein, data associated with a particular fiber "passes" a mask when the data falls within the limits set by the mask. For example, with reference to FIG. 11, the fiber of Example 1 passes the mask illustrated in FIG. 11 because, at every mode group number, the relative delay is not outside the limits set by the mask. The fiber of Example 2 does not pass the mask, because mode group 3 falls below the lower limit set by the mask for that mode group. Similarly, Example 3 does not pass the mask because mode groups 14 and 15 fall above the upper limit set by the mask for those mode groups. Similarly, a fiber or the data associated with the fiber "passes" a screen or other criterion when the data is not outside the limits set by the screen or criterion.

DMD Measurement at Second Wavelength

In some embodiments, those fibers selected as likely to meet bandwidth requirements at the second wavelength are subject to DMD measurements performed using laser input at the second wavelength to confirm that the fibers indeed meet these requirements. A third set of criteria may be applied for this confirmation. The third set of criteria include a third criterion using as input the measured differential mode delay (DMD) data for the multimode fiber measured at the second wavelength.

The third set of criteria is based on measurements at the second wavelength, and is used to quantify fiber performance at the second wavelength. The third set of criteria is similar to the first set of criteria, which also uses measurements at a particular wavelength, the first wavelength, to quantify performance at that wavelength. As such, the third set of criteria may be similar in nature to the first set of criteria, but at a different wavelength and likely with different specific parameters.

For example, the third set of criteria may include a criterion based on calculating an effective minimum bandwidth at the second wavelength ($minEMBc_2$) from the DMD data measured at the second wavelength. The third criterion comprises a requirement that $minEMBc_2$ is greater than or equal to a second threshold value. As with the first set of criteria, $minEMBc_2$ may be standards-based, such as the ISO/IEC standard for $minEMBc_2$ at 953 nm for an OM5 fiber.

Also for example, the third set of criteria may include a criterion based on applying a third mask to the DMD data measured at the second wavelength. The third criterion comprises a requirement that the DMD data measured at the second wavelength passes the parameters of the third mask. As with the first set of criteria, the mask may be standards-based, such as a standard mask defined by IEC 60793-1-49 for an OM5 fiber at 953.

The OM4 and OM5 standards-based criteria for fiber bandwidth performance are based on applying a calculation and/or a mask to data measured at a particular wavelength to quantify performance at that wavelength. These standards do not provide a way to quantify performance at a wavelength different from the wavelength at which data was measured.

In a manner similar to that described for the first wavelength, DMD data measured at the second wavelength may also be used to determine whether a fiber meets requirements for an overfilled launch at the second wavelength, such as the OM5 requirements for an overfilled launch at 953 nm. For example, DMD data measured at a second wavelength, such as 953 nm for OM5 fiber, may be used to calculate an overfilled launch bandwidth at the second wavelength ($OFLc_2$). For OM5 fiber, the criteria is that $OFLc_2$ is greater than or equal to 1850 MHz-km at 953 nm.

Applying the method described in FIG. 1A or FIG. 1B, for example, allows a fiber manufacturer to reduce the number of measurements performed at 953 nm to qualify OM5 fiber, by removing from consideration prior to measurement at 953 nm those OM4 fibers unlikely to meet the OM5 standard. Such a selection method would also allow a fiber manufacturer to select, for example, a fiber likely to meet customized customer requirements based on stored DMD data measured at 850 nm, and measure that fiber against the customer requirements.

OM4 and OM5 Fiber

In a non-limiting example, it is desired to select fiber likely to meet the OM5 standard based on the DMD measurements used to qualify the fiber based on meeting the OM4 standard. In this example, the first wavelength is 850 nm and the second wavelength is 953 nm. Fiber meeting the OM4 standard may be selected from a broader set of fiber based on DMD measurements performed at 850 nm and industry standard masks and/or calculation of $minEMBc_1$. The DMD measurements performed at 850 nm may then be transformed into mode group space for evaluation of the second criterion.

For OM5 fiber, in the case where the second criterion is based on calculating $minEMBc_2$, the second threshold value, i.e., the desired bandwidth at 953 nm of 2190 MHz-km, which corresponds to a minimum EMB of 2470 MHz-km.

For the case where the second criterion is based on a second mask, non-limiting examples of suitable masks are:

Loose Mask
the relative delay of the LP01 mode is equal to or greater than −0.02 ns/km;
the relative delay of the LP01 mode is equal to or less than 0.2 ns/km;
the relative delay of each of mode groups 2 through 5 is equal to or greater than −0.005 ns/km;
the relative delay of each of mode groups 2 through 5 is equal to or less than 0.065 ns/km;
the relative delay of each of mode groups 12 through 15 is equal to or greater than −0.055 ns/km;
the relative delay of each of mode groups 12 through 15 is equal to or less than 0.005 ns/km.

Optional Addition to Loose Mask:
the relative delay of each of mode groups 6 through 10 is equal to or greater than −0.055 ns/km;
the relative delay of each of mode groups 6 through 10 is equal to or less than 0.065 ns/km.

Nominal Mask
the relative delay of the LP01 mode is equal to or greater than −0.02 ns/km;
the relative delay of the LP01 mode is equal to or less than 0.14 ns/km;
the relative delay of each of mode groups 2 through 5 is equal to or greater than 0.0 ns/km;
the relative delay of each of mode groups 2 through 5 is equal to or less than 0.06 ns/km;
the relative delay of each of mode groups 12 through 15 is equal to or greater than −0.05 ns/km; and
the relative delay of each of mode groups 12 through 15 is equal to or less than 0.0 ns/km.

Optional Addition to Nominal Mask:
the relative delay of each of mode groups 6 through 10 is equal to or greater than −0.05 ns/km;
the relative delay of each of mode groups 6 through 10 is equal to or less than 0.06 ns/km.

Tight Mask
the relative delay of the LP01 mode is equal to or greater than −0.02 ns/km;
the relative delay of the LP01 mode is equal to or less than 0.14 ns/km;
the relative delay of each of mode groups 2 through 5 is equal to or greater than 0.0 ns/km;
the relative delay of each of mode groups 2 through 5 is equal to or less than 0.05 ns/km;
the relative delay of each of mode groups 11 through 15 is equal to or greater than −0.04 ns/km; and
the relative delay of each of mode groups 11 through 15 is equal to or less than 0.0 ns/km.

Optional Addition to Tight Mask:
the relative delay of each of mode groups 6 through 10 is equal to or greater than −0.04 ns/km;
the relative delay of each of mode groups 6 through 10 is equal to or less than 0.05 ns/km.

Figure 2:
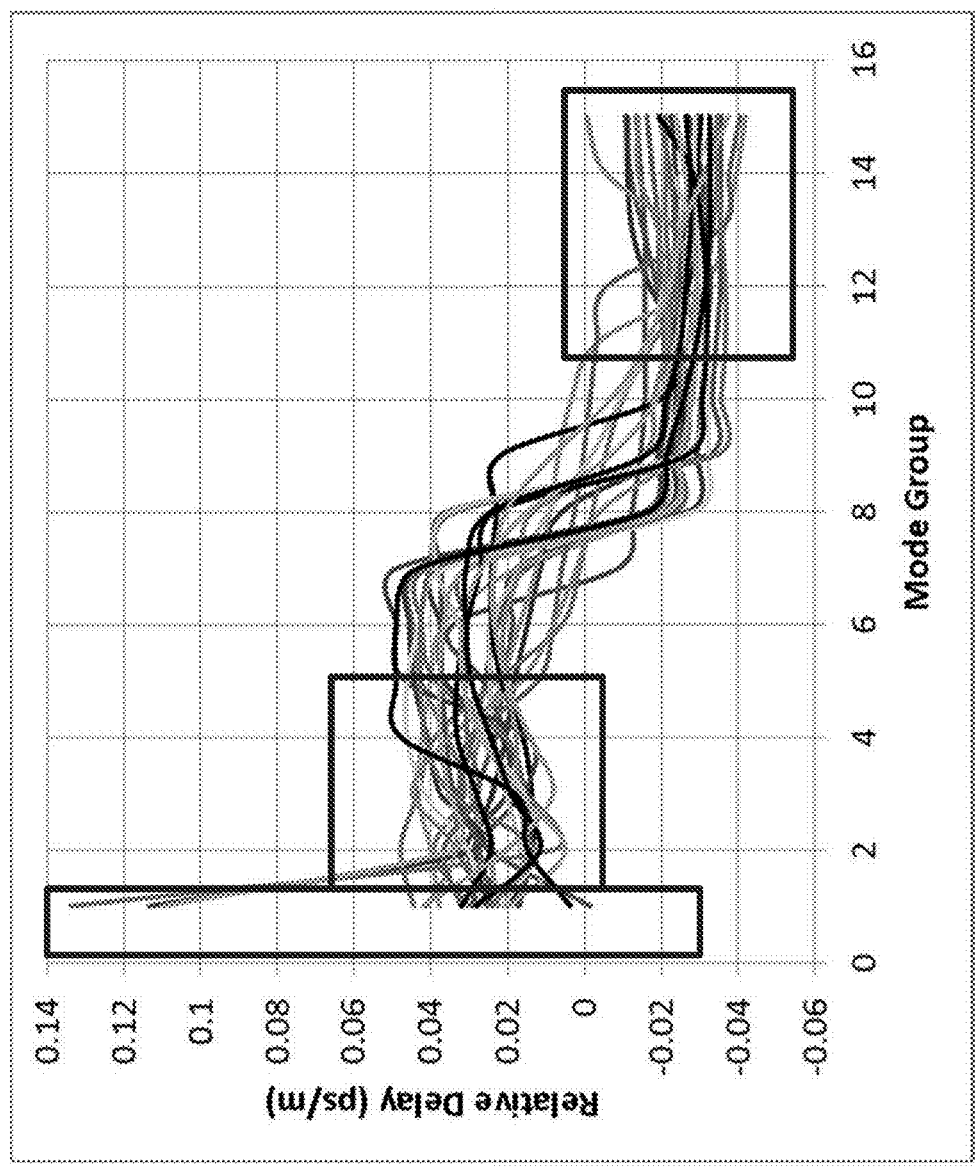
FIG. 2 shows a loose mask in mode group space.

These mask is applied to the relative mode group delay data obtained from a DMD measurement performed at 850 nm. These particular masks are illustrated in FIG. 2 (Loose Mask), FIG. 3 (Nominal Mask), and FIG. 4 (Tight Mask). A looser mask has a lower chance of eliminating from consideration a fiber that qualifies as OM5, at the cost of not eliminating from consideration some fibers that do not qualify as OM5.

The mode group delays are "relative" mode group delays. As such, the relevant information is contained in the differences between the mode group delays, and not in the absolute value assigned to each delay. In other words, the zero point for the mode group delays is arbitrarily chosen. This arbitrary choice may be referred to as "normalization." The mask parameters described herein are based on an arbitrarily chosen zero-point calculated by averaging the delay of mode groups 2 through 15, equally weighted by mode group. A different arbitrary zero point could be chosen, for example the delay of mode group 1 (for example), mode group 7, or some other arbitrary point. In that case, if the delay of mode group 1 were significantly different from the average delay of mode groups 2 through 15, a different mask would be needed to evaluate data normalized based on the delay of mode group 1. That different mask would be the mask described herein, shifted along the y-axis by the difference between the delay of mode group 1 and the average of mode groups 2-15. But, that different mask would still literally "require, for the relative mode group delay data" that the data meet the criteria of the masks described herein, normalized as described herein to the average of mode groups 2-15.

The third criterion in selecting OM5 fiber may be, for example, the use of a mask applied to DMD measurements performed at the second wavelength, or the calculation of $minEMBc_2$ from DMD measurements performed at the second wavelength.

Optional Additional Criterion

In some embodiments, "subset" language is used to describe the results of a selection process. In these embodiments, the first subset is a subset of the plurality of multimode fibers, which means that the first subset includes all or just some of the plurality of fiber. Similarly, the second subset is a subset of the first subset, which means that the second subset includes all or just some of the fibers in the first subset. The third subset is a subset of the second subset, which means that the third subset includes all or just some of the fibers in the second subset.

System

In some embodiments, a system includes components for selecting a multimode fiber meeting requirements of a first minimum bandwidth at a first wavelength and a second minimum bandwidth at a second wavelength greater than the first wavelength. The system comprises:
a measurement device configured to measure differential mode delay (DMD) data for the multimode fiber at the first wavelength, wherein the DMD data comprises output laser pulse data as a function of the radial position of an input laser pulse having the first wavelength;

a processor device configured to transform the DMD data into mode group space, to obtain mode group delays relative to the average delays of mode groups 2 through 15 a first selection device configured to select the multimode fiber if the multimode fiber passes a first mask applied to the DMD data for the multimode fiber at the first wavelength;

a second selection device configured to select the multimode fiber if the multimode fiber passes a second mask applied to the relative mode group delay data.

The processor device, first selection device and second selection device may be the same device, or different devices in different permutations. For example, a single computer may be specifically configured to transform the DMD data and select the fiber. Or, a first computer may be configured as the first selection device, while a second computer may be configured as the processor device and second selection device. Other permutations are possible.

One advantage of transforming the delays to mode group space is that this method explicitly incorporates changes in the number of mode groups with wavelength. For example, there are nominally 18 mode groups at 850 nm but only 16 at 953 nm. An algorithm solely based on the radial delays at 850 nm cannot easily deconvolve the effects of the $17^{th}$ and $18^{th}$ mode groups from the higher order mode delays, and this is essentially obtaining an accurate calculation or estimation of the effective modal bandwidth at 853 nm. As used herein, "deconvolving" refers to an algorithm or process for selecting the time delays from pulse data, such as measured DMD pulse data. A second advantage is that the mask clearly delineates the behaviors of the LP01 mode, the lower order mode groups (including 2 through 5) and the higher order mode groups (including 12 through 15). We have observed that there is often a delay "step" between the lower and higher order mode groups, and different masks for the lower order mode groups and higher order mode groups accommodates this delay structure.

EXAMPLES

Example 1

DMD measurements were performed at a wavelength of 850 nm on a multimode first optical fiber. FIG. 5 shows delays vs radial offset based on these measurements. The fiber was verified to meet the OM4 standards.

The delay vs. offset data (in radial space) from the DMD measurement was transformed into mode group space. The transformation was by inversion of a $P_{xg}$ matrix. The mode group delays were normalized on a fiber-by-fiber basis to the average (centroid) delays of mode groups 2 through 15. FIG. 6 shows the results of this transformation.

Example 2

DMD measurements were performed at a wavelength of 850 nm on a second multimode optical fiber. FIG. 7 shows delays vs radial offset based on these measurements. The fiber was verified to meet the OM4 standards.

The delay vs. offset data (in radial space) from the DMD measurement was transformed into mode group space. The transformation was by inversion of a $P_{xg}$ matrix. The mode group delays were normalized on a fiber-by-fiber basis to the average (centroid) delays of mode groups 2 through 15. FIG. 8 shows the results of this transformation.

Example 3

DMD measurements were performed at a wavelength of 850 nm on a third multimode optical fiber. FIG. 9 shows delays vs radial offset based on these measurements. The fiber was verified to meet the OM4 standards.

The delay vs. offset data (in radial space) from the DMD measurement was transformed into mode group space. The transformation was by inversion of a $P_{xg}$ matrix. The mode group delays were normalized on a fiber-by-fiber basis to the average (centroid) delays of mode groups 2 through 15. FIG. 10 shows the results of this transformation.

Example 4

A single point was extracted from the data for each of the mode groups of FIGS. 6, 8 and 10. This point was based on the peak value, illustrated as a vertical black line. For some mode groups, there was also a secondary peak at a different delay value, as indicated by a vertical grey line. The points selected are plotted in FIG. 11. The mask of FIG. 3 (the nominal mask) is superimposed on FIG. 11. Only Example 1 meets the selection criterion of the mask. Example 2 fails due to too much leading behavior in mode group 3. Example 3 fails due to too much lagging behavior in mode groups 13-15.

DMD measurements were performed on the fibers of Examples 1-3 at 953 nm. minEMBc$_2$ was calculated for each of the fibers based on this DMD measurement. The minEMBc$_2$ values for the three fibers were:

Example 1: 2310 MHz-km
Example 2: 2090 MHz-km
Example 3: 2140 MHz-km

These values are consistent with the prediction obtained from the mask in FIG. 11—Example 1 has minEMBc$_2$ sufficiently high (greater or equal to 2190 MHz-km) to qualify as an OM5 fiber, while Examples 2 and 3 do not.

Example 6

Figure 3:
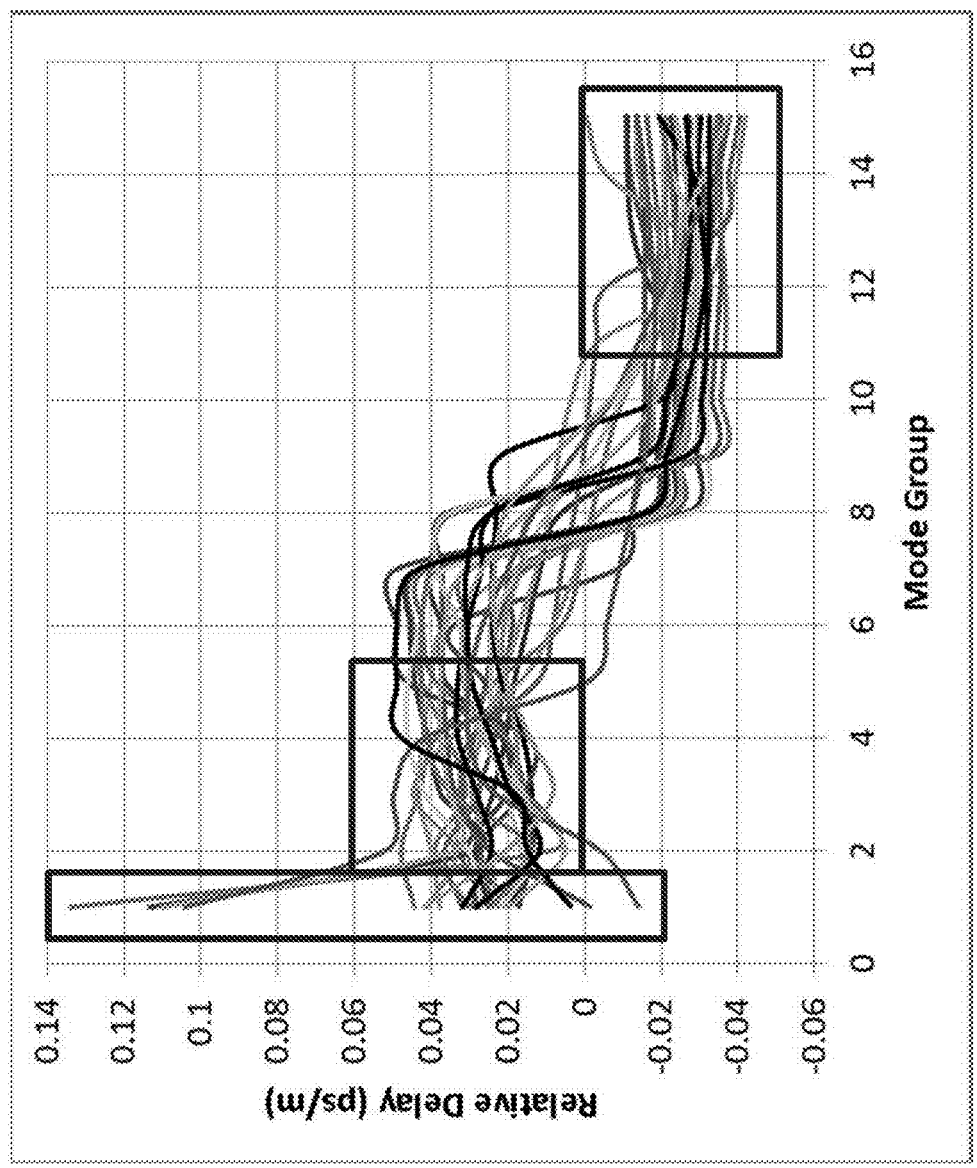
FIG. 3 shows a nominal mask in mode group space.
Figure 4:
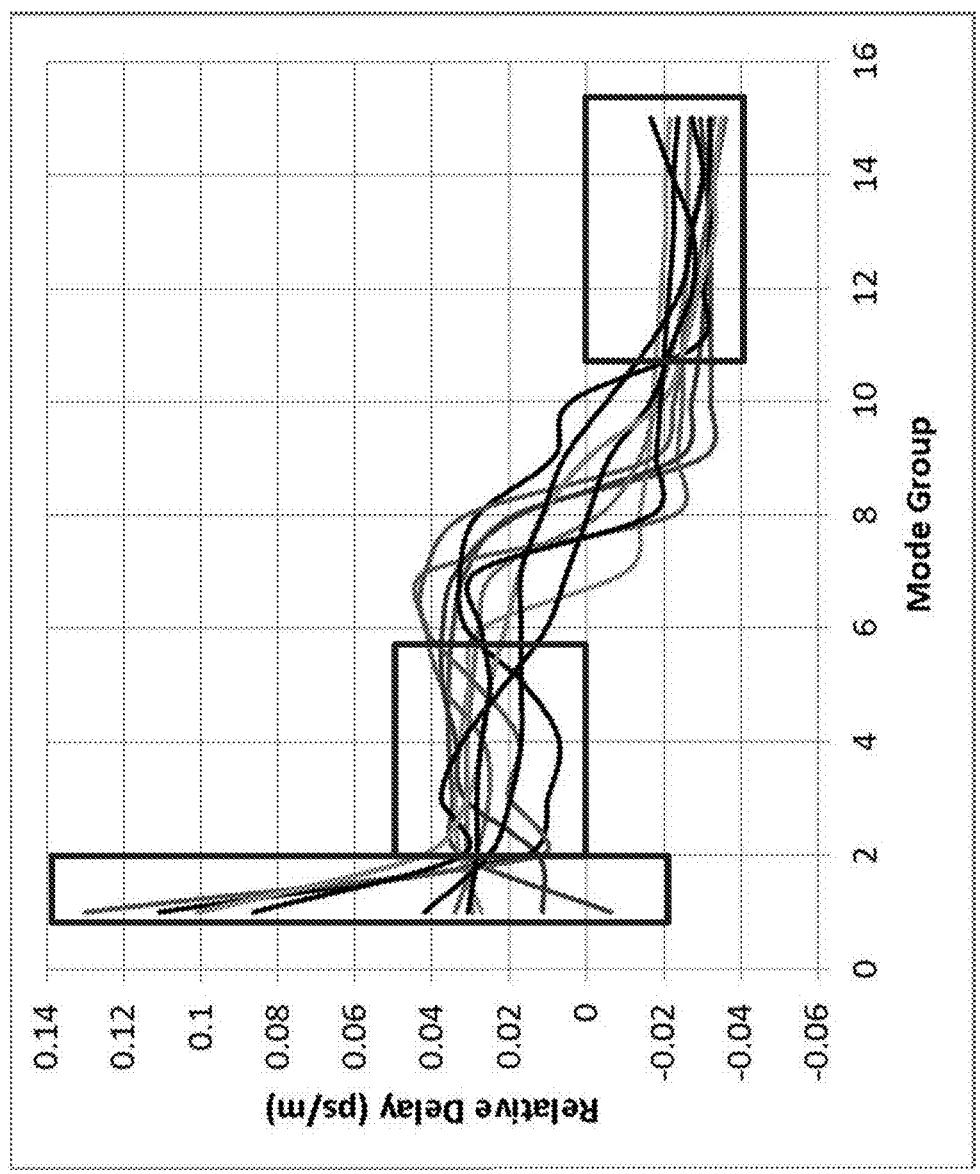
FIG. 4 shows a tight mask in mode group space.

For the fibers that met the criteria for OM4, the data from the DMD measurements at 850 nm was transformed into mode group space and compared to the masks of FIGS. 2-4. The results of this comparison are shown in Table 2. 953 nm DMD Screening Efficiency without Mask is the number of OM5 fibers found (43 fibers) divided by the number of fibers measured at 953 nm (185 fibers). 953 nm DMD Screening Efficiency with Mask is the number of OM5 fibers found (see Table 2) divided by the number of fibers measured at 953 nm (see Table 2).

TABLE 2

|  | Loose Mask | Nominal Mask | Tight Mask |
| --- | --- | --- | --- |
| Fibers that failed second mask criteria | 74 | 87 | 90 |
| Fibers passed forward for 953 DMD measurement | 111 | 98 | 95 |
| Fibers validated to be OM5 | 56 | 54 | 52 |
| Fibers that failed 953 nm DMD | 68 | 68 | 68 |
| Additional Fibers Predicted to Fail 953 nm DMD that would not | 0 | 13 | 16 |

TABLE 2-continued

| | Loose Mask | Nominal Mask | Tight Mask |
|---|---|---|---|
| have been measured | | | |
| 953 nm DMD Screening Efficiency without Mask | 0.23 | 0.23 | 0.23 |
| 953 nm DMD Screening Efficiency with Mask | 0.39 | 0.42 | 0.41 |

Table 2 shows that the use of a mask can significantly improve screening efficiency. A loose mask may be used to identify all or nearly all OM5 fibers, while improving efficiency. Tighter masks may be used to further improve efficiency, but at the potential cost of eliminating some OM5 fiber before it can be measured and validated at 953 nm.

Conclusion

Those skilled in the relevant art will recognize and appreciate that many changes can be made to the various embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular embodiments only and is not intended to be limiting. Features shown in the drawing are illustrative of selected embodiments of the present description and are not necessarily depicted in proper scale. These drawing features are exemplary, and are not intended to be limiting.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

What is claimed is:

1. A method of selecting a multimode fiber meeting requirements of a first minimum bandwidth at a first wavelength and a second minimum bandwidth at a second wavelength different from the first wavelength, the method comprising:
   measuring differential mode delay (DMD) data for the multimode fiber at the first wavelength, wherein the DMD data comprises output laser pulse data as a function of the radial position of an input laser pulse having the first wavelength;
   transforming the DMD data into mode group space, to obtain relative mode group delays data as a function of mode group;
   selecting the multimode fiber based on meeting requirements of the first minimum bandwidth at the first wavelength based on a first set of criteria comprising:
   a first criterion using as input the measured differential mode delay (DMD) data for the multimode fiber measured at the first wavelength; and
   selecting the multimode fiber based on meeting requirements of the second minimum bandwidth at the second wavelength based on a second set of criteria, comprising:
   a second criterion using as input the relative mode group delay data.

2. The method of claim 1 wherein the DMD data measured at the first wavelength ($F_{xt}$) is transformed into mode group delay data ($h_{gt}$) by inversion of a $P_{xg}$ matrix.

3. The method of claim 2, wherein the inversion uses a linear constrained least squares approach that constrains $h_{gt}$ to be a smooth function of mode group (g).

4. The method of claim 3, wherein the inversion using constrained least squares and a smoothness constraint applies this constraint in a weighted manner depending on mode group number (g).

5. The method of claim 1, further comprising calculating an effective minimum bandwidth at the first wavelength ($minEMBc_1$) from the DMD data measured at the first wavelength, and wherein the first criterion requires that $minEMBc_1$ is greater than or equal to a first threshold value.

6. The method of claim 5, wherein the first wavelength is in the range 847 nm-853 nm and the first threshold value is 4160 MHz-km.

7. The method of claim 6, further comprising calculating from the DMD data measured at the first wavelength an overfilled launch bandwidth at the first wavelength ($OFLc_1$), and wherein the first set of criteria further comprise a criterion requiring that $OFLc_1$ is greater than or equal to 3500 MHz-km.

8. The method of claim 1, further comprising applying a first mask to the DMD data measured at the first wavelength, and wherein the first criterion requires that the DMD data measured at the first wavelength passes the first mask.

9. The method of claim 1, further comprising deconvolving the relative mode group delay data at the first wavelength to calculate $minEMBc_2$ at the second wavelength, and wherein the second criterion requires that $minEMBc_2$ is greater than or equal to a second threshold value.

10. The method of claim 9, wherein the first wavelength is in the range 847 nm-853 nm, the second wavelength is 950 nm-956 nm, and the second threshold value of $minEMBc_2$ is 2190 MHz-km.

11. The method of claim 1, further comprising applying a second mask to the relative mode group delay data, and wherein the second criterion requires that the relative mode group delay data passes the second mask.

12. The method of claim 11, wherein the first wavelength is in the range 847 nm-853 nm, the second wavelength is 950 nm-956 nm, and the second mask requires:
   the relative delay of the LP01 mode is equal to or greater than −0.02 ns/km;
   the relative delay of the LP01 mode is equal to or less than 0.2 ns/km;
   the relative delay of each of mode groups 2 through 5 is equal to or greater than −0.005 ns/km;
   the relative delay of each of mode groups 2 through 5 is equal to or less than 0.065 ns/km;
   the relative delay of each of mode groups 12 through 15 is equal to or greater than −0.055 ns/km;
   the relative delay of each of mode groups 12 through 15 is equal to or less than 0.005 ns/km.

13. The method of claim 12, wherein the second mask requires:
   the relative delay of each of mode groups 6 through 10 is equal to or greater than −0.055 ns/km;
   the relative delay of each of mode groups 6 through 10 is equal to or less than 0.065 ns/km.

14. The method of claim 11, wherein the first wavelength is in the range 847 nm-853 nm, the second wavelength is in the range 950 nm-956 nm, and the second mask requires:

the relative delay of the LP01 mode is equal to or greater than −0.02 ns/km;
the relative delay of the LP01 mode is equal to or less than 0.14 ns/km;
the relative delay of each of mode groups 2 through 5 is equal to or greater than 0.0 ns/km;
the relative delay of each of mode groups 2 through 5 is equal to or less than 0.06 ns/km;
the relative delay of each of mode groups 11 through 15 is equal to or greater than −0.05 ns/km; and
the relative delay of each of mode groups 11 through 15 is equal to or less than 0.0 ns/km.

15. The method of claim 14, wherein the second mask requires:
the relative delay of each of mode groups 6 through 10 is equal to or greater than −0.05 ns/km;
the relative delay of each of mode groups 6 through 10 is equal to or less than 0.06 ns/km.

16. The method of claim 11, wherein the first wavelength is in the range 847 nm-853 nm, the second wavelength is in the range 950 nm-956 nm, and the second mask requires:
the relative delay of the LP01 mode is equal to or greater than −0.02 ns/km;
the relative delay of the LP01 mode is equal to or less than 0.14 ns/km;
the relative delay of each of mode groups 2 through 5 is equal to or greater than 0.0 ns/km;
the relative delay of each of mode groups 2 through 5 is equal to or less than 0.05 ns/km;
the relative delay of each of mode groups 12 through 15 is equal to or greater than −0.04 ns/km; and
the relative delay of each of mode groups 12 through 15 is equal to or less than 0.0 ns/km.

17. The method of claim 16, wherein the second mask requires:
the relative delay of each of mode groups 6 through 10 is equal to or greater than −0.04 ns/km;
the relative delay of each of mode groups 6 through 10 is equal to or less than 0.05 ns/km.

18. The method of claim 1, further comprising:
measuring differential mode delay (DMD) data for the multimode fiber at the second wavelength, wherein the DMD data comprises output laser pulse data as a function of the radial position of an input laser pulse having the second wavelength
selecting the multimode fiber based on meeting requirements of the second minimum bandwidth at the second wavelength based on a third set of criteria in addition to the second set of criteria, the third set of criteria comprising:
a third criterion using as input the measured differential mode delay (DMD) data for the multimode fiber measured at the second wavelength.

* * * * *